US006758162B1

(12) United States Patent
Van Heygen

(10) Patent No.: US 6,758,162 B1
(45) Date of Patent: Jul. 6, 2004

(54) REPTILE FEEDER

(75) Inventor: Emmanuel Van Heygen, Mechelen (BE)

(73) Assignee: Rolf C. Hagen, Inc., Montreal (CA)

( * ) Notice: Subject to any disclaimer, the term of this patent is extended or adjusted under 35 U.S.C. 154(b) by 0 days.

(21) Appl. No.: 10/320,945

(22) Filed: Dec. 17, 2002

(51) Int. Cl.[7] ................................................ A01K 5/00
(52) U.S. Cl. ................................................... 119/51.01
(58) Field of Search ............................. 119/51.01, 6.5, 119/452, 473, 246, 469, 470; D20/102, 107; D9/307, 302, 310, 335, 336, 524; D7/515, 518, 521, 560, 308

(56) References Cited

U.S. PATENT DOCUMENTS

| | | | |
|---|---|---|---|
| D246,438 S | * 11/1977 | Weber | D9/499 |
| 4,234,780 A | 11/1980 | McCarthy | |
| 4,318,945 A | 3/1982 | Goldman et al. | |
| 4,708,089 A | 11/1987 | Goldman et al. | |
| 5,062,542 A | * 11/1991 | Morton | 220/269 |
| 5,261,352 A | 11/1993 | Stammelman | |
| D343,117 S | * 1/1994 | Mansau | D9/335 |
| 5,406,054 A | 4/1995 | Chirdon | |
| 5,482,172 A | * 1/1996 | Braddock | 215/235 |
| 5,630,374 A | * 5/1997 | Cunningham | 119/6.5 |
| 5,778,824 A | 7/1998 | Musgrave et al. | |
| 5,791,293 A | 8/1998 | Northrop et al. | |
| 5,857,430 A | 1/1999 | Griffiths | |
| 5,988,424 A | * 11/1999 | Kovens | 220/254.3 |
| 6,073,581 A | * 6/2000 | Wang | 119/51.01 |
| 6,338,315 B1 | * 1/2002 | Stillman | 119/51.01 |

OTHER PUBLICATIONS

Sidney's Bearded Dragon Care Tips, http://users.erols.com/ziring/dragon–care.html, Nov. 21, 2001.*

* cited by examiner

*Primary Examiner*—Charles T. Jordan
*Assistant Examiner*—Kimberly S. Smith
(74) *Attorney, Agent, or Firm*—Wolf, Greenfield & Sacks, P.C.

(57) ABSTRACT

A feeding apparatus for use within a terrarium for feeding insects such as crickets to reptiles and/or other animals in the terrarium. The apparatus consists of a structure having a chamber in which the insects can move about, a cover that provides access to the chamber for introducing insects and powder supplements to the chamber, and a small port and manually removable port plug for enabling the insects to exit the chamber to the terrarium when the plug is removed. The structure and cover may create the image of a simulated rock. The feeding apparatus has a substantially flat surface for maintaining the rock structure in a stable position in the terrarium. Also disclosed is a method for feeding reptiles insects comprising the steps of pouring a vitamin powder supplement into a container with insects, closing the container, gently shaking the container to coat the insects with the powder, placing the container in a terrarium, and uncovering at least one opening in the container for insects to exit the container into the terrarium.

3 Claims, 3 Drawing Sheets

REPTILE FEEDER

BACKGROUND OF INVENTION

Field of Invention

This invention relates to terrariums and in particular to feeding reptiles and amphibians within a terrarium. Many products are commercially available for this purpose but there is a need for feeding apparatus that maintains the natural habitat of a terrarium environment. The prior art fails to provide a reptile or amphibian feeder that simulates the natural feeding behavior of such animals, and it fails to provide a means and method by which a supplement powder such as vitamin powder can be conveniently added to the feed without excessive waste and mess.

SUMMARY OF INVENTION

The reptile feeder of the present invention is preferably in the form of a structure that occurs in an animal's natural habitat, such as a rock, mound of earth, tree stump, etc. In the embodiment shown by way of example, the feeder is a simulated rock. The rock is divided into a main hollow body part and a cover. The hollow body serves as a chamber for introducing insects such as crickets and vitamin supplement powder into a terrarium. The insects are coated with the powder by gently shaking the closed simulated rock. An exit port is provided in the rock to allow the insects to exit the chamber, and a plug is included to close the chamber when the insects and powder are mixed together and the feeder is placed in the terrarium. The plug is removed after the feeder is placed in the terrarium to allow the insects to leave the chamber and enter the terrarium proper where they may be consumed by the animals.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing.

The objects, advantages and features of this invention will be more clearly appreciated from the following detailed description, when taken in conjunction with the accompanying drawings in which.

DETAILED DESCRIPTION

Figure 1:
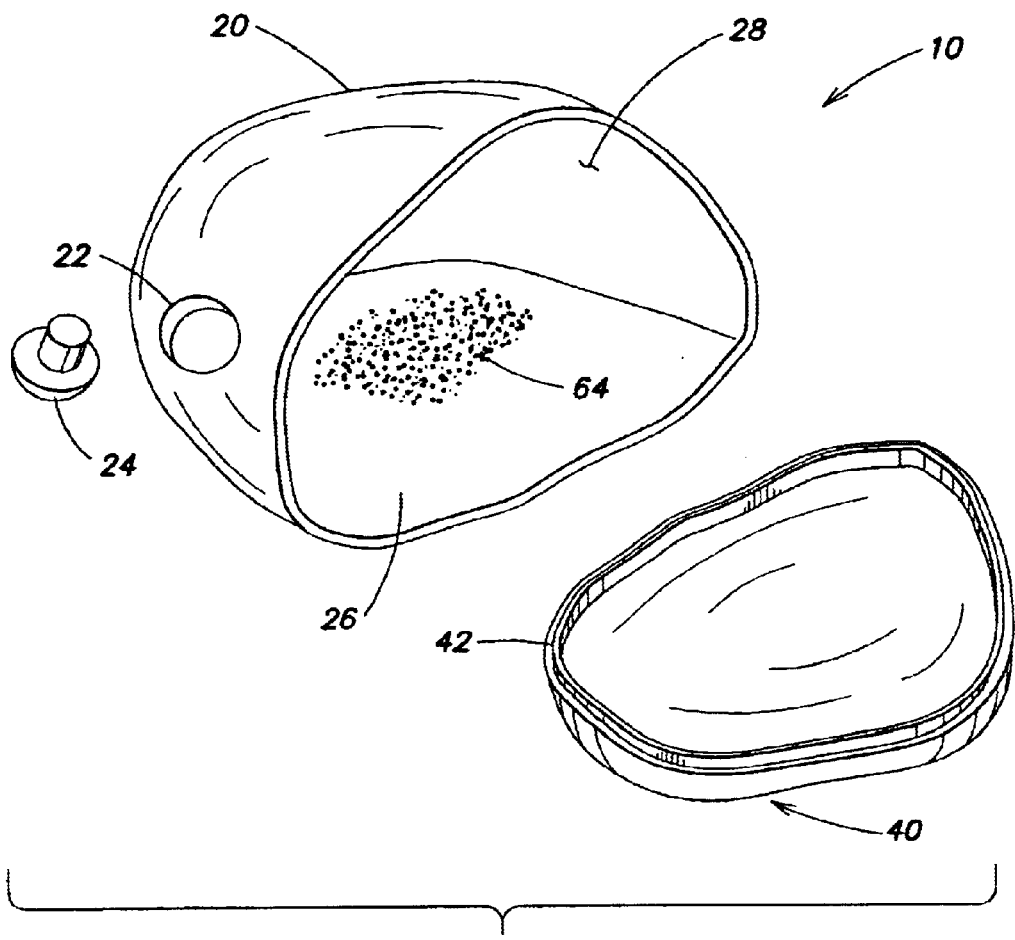
FIG. 1 is a perspective view of the open reptile and amphibian feeder.

10—feeding apparatus
20—feeder body
22—insect port
24—insect plug
26—filling opening
28—feeder chamber
40—feeder lid
42—raised lip
60—insect
62—terrarium
64—supplement powder This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing", or "involving," and variations thereof herein, is meant to encompass the items listed thereafter and equivalents thereof as well as additional items. In the following description the device is sometimes called "reptile feeder" or defined as used for feeding that animal, but it should be understood that these terms do not limit the application of the invention to that specific animal.

Figure 2:
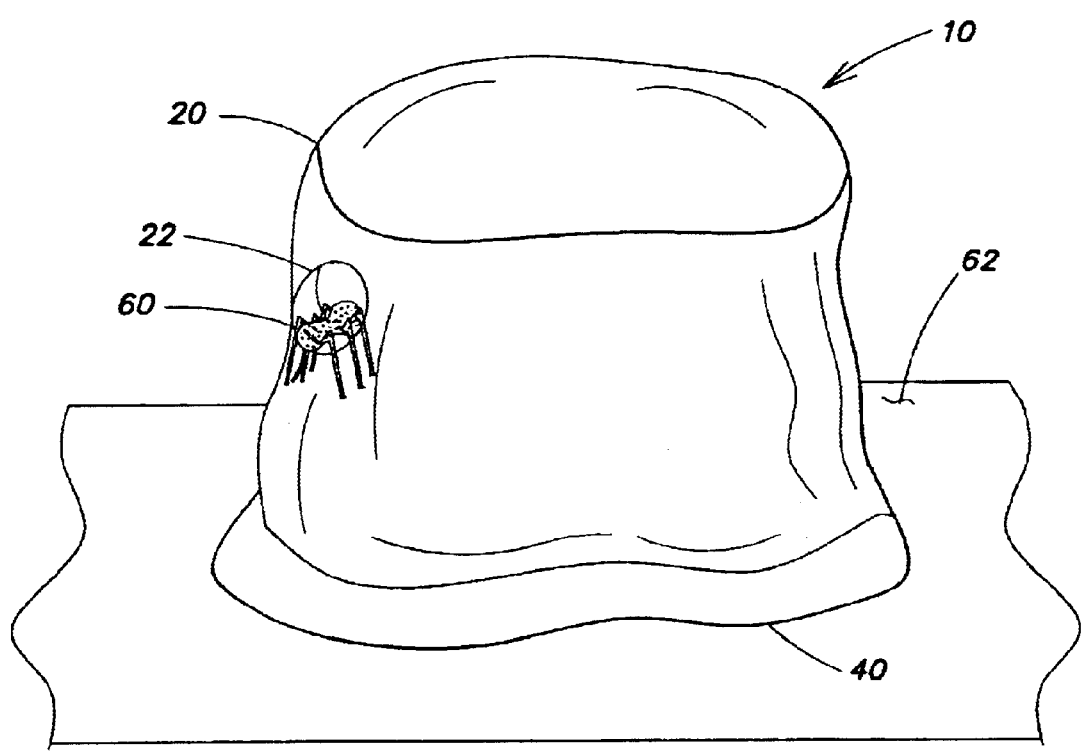
FIG. 2 is a perspective view of the feeder in a terrarium with an insect exiting through the insect port of the reptile feeder.

The reptile and amphibian feeder is a feeding device that holds insects, primarily for use within a terrarium 62. In particular, the feeder is used with a vitamin supplement powder 64. Shown in FIG. 1, the feeder provides a method for easily incorporating a vitamin supplement powder with a live food source, minimizing excess powder use and mess. The live food source, usually insects, is gently mixed with the supplement powder within the feeder, until the insects are lightly coated with the powder. FIG. 2 shows the feeder in place inside the terrarium 62, and also shows an insect slowly exiting the device into the terrarium 62 for consumption by the reptiles or other animals in it.

In a preferred embodiment, the reptile feeder 10 includes a feeder body 20 and a feeder lid 40 that define a chamber 28 and when aligned, properly register with one another to close the chamber. The shape of the reptile feeder can be of any desirable configuration, such as a rock, mound of earth, tree stump, etc. The preferred embodiment shown is a simulated rock. The rock design adds to the decor of the terrarium and it also maintains the look of the natural surrounding in the terrarium. The feeder 10 is preferably made of polyresin.

Figure 3:
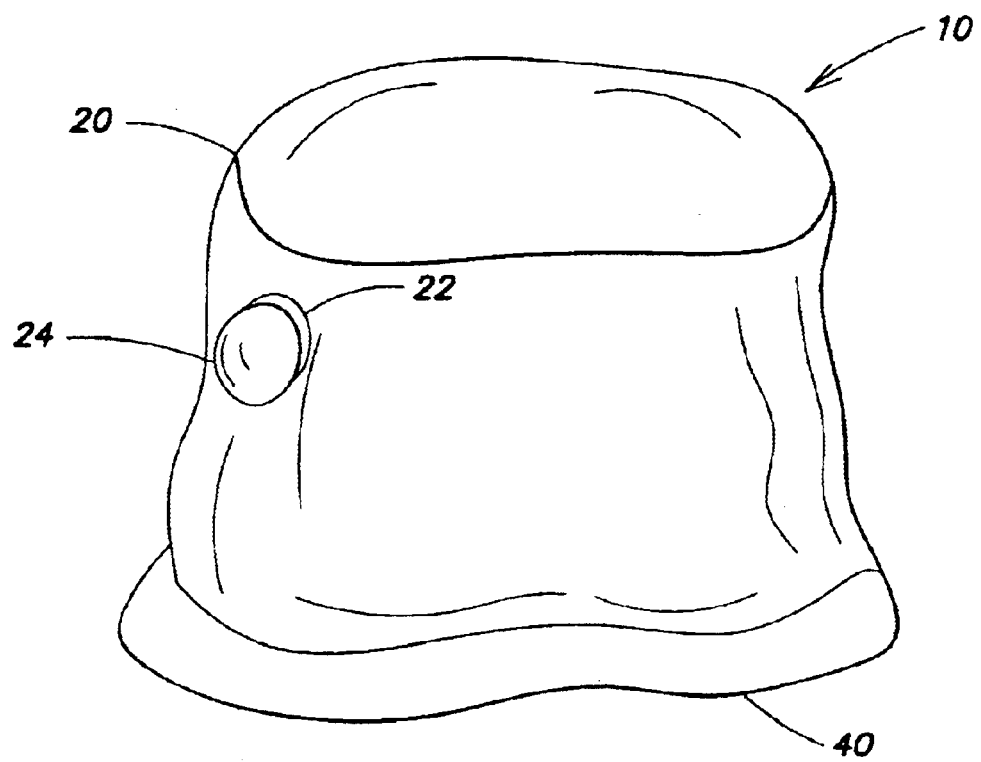
FIG. 3 is a perspective view of the closed feeder with the insect plug in the insect port.

Shown in FIG. 3, the feeder body 20 includes an insect port 22 and a corresponding insect plug 24. The port 22 can be located anywhere on the feeder body 20 and provides an exit for the insects from the chamber 28. In a preferred embodiment, the insects are crickets. The insect plug 24 is inserted into the insect port 22 whenever it is desired to retain the feeder contents in the feeder chamber. The feeder body 20 also has a filling opening 26 that is closed by the feeder lid 40. The opening 26 is used to introduce insects and vitamin supplement powder into the reptile chamber 28.

When the feeder chamber 28 is filled with the desired amount of insects and supplement powder, the feeder lid 40 is used to close the filling opening 26. A raised lip 42 located on the feeder lid 40 assists in aligning the lid and body 20 and also prevents the feeder body 20 from sliding off the lid 40. When the port 22 and openings 26 are closed, the reptile feeder is gently shaken to thoroughly coat the insects with the supplement powder.

The reptile feeder 10 full of insects coated with the supplement powder is placed in the terrarium 62. The plug 24 is then removed, allowing the insects to exit the reptile feeder into the terrarium. The reptile or other animal within the terrarium may then eat the coated insects, consuming the beneficial vitamin supplement powder as well.

The reptile feeder is advantageous because it provides an easy way for causing reptiles and amphibians to obtain valuable supplements. Alternative methods of feeding reptiles and amphibians a powder supplement are messy, and large portions of excess powder are wasted. However, with the present invention, excess powder that is left within the chamber 28 can be reused because it is retained within the feeder and it does not come into contact with anything outside of the feeding rock that may contaminate it. The feeder also prevents the growth of dangerous bacteria that can form on objects within the terrarium if a vitamin residue remains. This is especially dangerous in humid terrarium conditions.

An additional benefit of this invention is that it simulates the natural feeding behavior of reptiles and amphibians. Because the insects are contained within the feeder, the reptile or amphibian must wait until the insects exit it, through the insect port 22. The animal is still required to hunt the insect in the terrarium. Thus despite the fact that the reptile or amphibian is confined to a domesticated environment in the terrarium, natural feeding behavior still prevails.

The reptile feeder provides a method and apparatus for feeding a reptile or amphibian live insects that carry a vitamin supplement powder. It provides a method for reducing the amount of supplement powder waste, and it reduces the mess associated with powder supplements, all the while simulating the animal's natural feeding behavior.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only, and the scope of the claims should be determined by the appended claims and their equivalents.

What is claimed is:

1. A method of feeding insects to animals in a terrarium comprising the steps of providing a structure of a shape found in nature as part of the natural habitat of the animals and having a first and second portion wherein the two portions together define a closed chamber, said structure also having a supporting surface for maintaining the structure in a stable position in the terrarium, providing a port and a removable closure for closing the port in the structure, enabling insects to leave the chamber when the structure rests on the supporting surface, separating the two portions of the structure to open the chamber and introducing insects and a powder supplement into the chamber, assembling the two portions of the structure and then gently shaking the structure to coat the insects with the powder, and placing the assembled structure in a terrarium on its supporting surface and removing the closure for enabling the coated insects to crawl out of the chamber into the terrarium.

2. A method according to claim 1, wherein the powder is a vitamin supplement.

3. A method as described in claim 2 wherein the container is in the form of a rock, mound of earth, or tree stump configuration.

\* \* \* \* \*